United States Patent

Wenzel

[11] 4,050,118
[45] Sept. 27, 1977

[54] FISH PROCESSING MACHINES

[75] Inventor: Werner Wenzel, Lubeck, Germany

[73] Assignee: Nordischer Maschinenbau Rud. Baader, Lubeck, Germany

[21] Appl. No.: 674,839

[22] Filed: Apr. 8, 1976

[51] Int. Cl.² ............................................. A22C 25/00
[52] U.S. Cl. ............................................. 17/54; 17/52
[58] Field of Search .............. 17/52, 54, 57; 198/395, 198/401, 399, 502

[56] References Cited

U.S. PATENT DOCUMENTS

| 1,800,290 | 4/1931 | Gottschack | 198/395 |
| 2,245,330 | 6/1941 | Danielsson | 17/54 |
| 2,430,935 | 11/1947 | Klug | 198/502 X |
| 3,076,997 | 2/1963 | Evich | 17/54 |
| 3,187,375 | 6/1965 | Williamson et al. | 17/52 X |
| 3,309,730 | 3/1967 | Michael | 17/54 |
| 3,561,044 | 2/1971 | Evich | 17/54 |
| 3,838,292 | 9/1974 | Sullivan | 198/395 X |
| 3,955,242 | 5/1976 | Hartmann | 17/57 |

FOREIGN PATENT DOCUMENTS

| 2,400,677 | 7/1975 | Germany | 17/54 |

Primary Examiner—Robert Peshock
Assistant Examiner—Paul J. Hirsch
Attorney, Agent, or Firm—Edward F. Levy

[57] ABSTRACT

A device for the control of the tools of a fish processing machine adapted to process fish of various species. The device comprises a first sensing element for being displaced by a fish fed through the machine, a second sensing element downstream said first sensing element for also being displaced by said fish, control means being actuated by said second sensing element to effect a fish processing tool, and means for varying the setting of the proportionality ratio of the second sensing element and the control means to the extent of displacement of the first sensing element.

6 Claims, 1 Drawing Figure

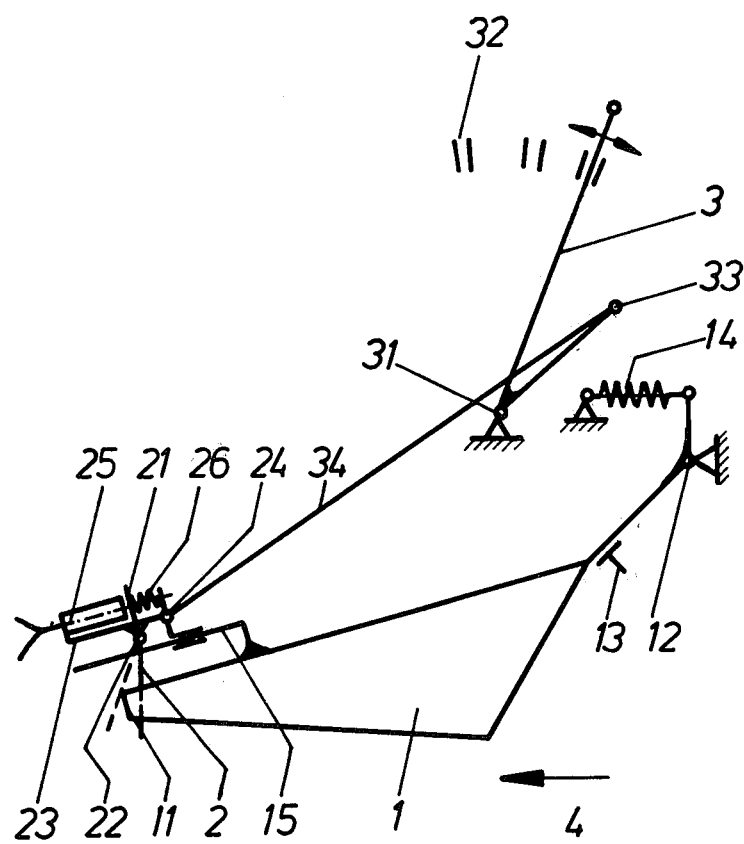

4,050,118

FISH PROCESSING MACHINES

BACKGROUND OF THE INVENTION

The invention relates to a device for the control of the tools of a fish processing machine.

Through the DT OS 2,400,677, a fish processing machine has already become known, which is provided with a feeler and in which the differences in the lengths between the processing location and the end of differently large fish scanned by the feeler must be so compensated that the processing tool comes into action at the desired place on each fish independently of its size. The feeler can in that case be provided with an auxiliary sensor, arranged closed behind its scanning edge and movable independently thereof, and a switch delivering a control pulse on relative motion between the feeler and the auxiliary sensor.

Although this fish processing machine makes possible the compensation of the differences in size of a certain kind of fish, it has however, the disadvantage that it does not make possible any adaptation to other kinds of fish.

BRIEF SUMMARY OF THE INVENTION

While overcoming the disadvantages of the prior art machine it is one of the main objects of the invention to provide for a device in a fish processing machine by which an adaptation of the control means of the machine to various species of fish is rendered possible.

According to the present invention, there is provided a device for controlling a tool of fish processing machine, the device comprising a first sensing element supported to be pivotably displaceable by a fish fed along a feed path of such machine, a second sensing element disposed downstream of the first sensing element and displaceable by such fish to cause control means to generate a signal for controlling such tool, the second sensing element and the control means each being so displaceable in presettable proportionality ratio to the extent of the pivotal displacement of the first sensing element as to vary the position of the second sensing element relative to the first sensing element in accordance with the size of a fish sensed by the first sensing element, and means to vary the setting of the proportionality ratio.

A practically resistance-free scanning of the fish with great accuracy even at great speed of advance of the fish may be obtained by utilising magnetically operable control means.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

The single FIGURE of the accompanying drawing schematically shows a device in accordance with the invention leaving out those parts of the fish processing machine which may be varied and are not essential for the understanding of the invention.

DETAILED DESCRIPTION OF THE PREFERRED EMBODIMENTS

Referring now to the accompanying drawing, arranged in a frame (not shown) are support means (not shown) defining a feed path for fish to be conveyed in a direction of the arrow 4, means for conveying the fish and tools for processing the fish. Associated with one of these tools is first sensing element in the form of a feeler 1, which is disposed above the path of the fish and which is pivotable about a pivot axis 12 fixed in the frame. The feeler 1 is locatable in a datum position by an abutment 13, secured on the frame (not shown). The feeler 1 is resiliently towards its datum position by a tension spring 14. The feeler 1 defines a downwardly open channel which is V-shaped in cross-section, the roof portion of the channel slopes downwardly in the drawing towards its downstream end and carries a rectilinear guide member 15, on which a carrier member 23 is slidably mounted. The carrier member 23 is pivotably connected at 24 with an elongate rod 34. As shown in the drawing, the upper end of the rod 34 is pivotable about pivot connection 33 defining the centre of rotation of the rod 34. The pivot connection 33 is provided at the end of one of two arms of an angle lever 3, which is pivotable about a pivot axis 31 provided on the frame and which is settable by being engaged at a selected one of different locations defined by detent means 32. The detent means 32 is secured on the frame (not shown). The slidable carrier member 23 carries control means in the form of a switch 25, which is fixed to the carrier member 23. The carrier member 23 also carries a double-armed lever, which is mounted to be pivotable about a pivot axis 22 and the lower end of which in the drawing forms a second sensing element 2 and the upper end of which forms a switch actuating vane 21. Coming into use as switch 25 is an electronic proximity initiator. The switch 25 is actuated by movement of the metallic vane 21 away from the switch and against the action of a retaining spring 26.

The mode of operation of the device is as follows:

A fish, on being conveyed along the feed path with (for example) its head end having been opened by severing of the head of the fish, displaces the feeler 1 upwardly as a result of interaction of the feeler 1 with the back of the fish. The feeler 1 is thus pivoted upwardly against the resetting effect of the tension spring 14. In that case, the rod 34 is lso pivotably displaced about the pivot 33 and, with increasing upward deflection of the feeler 1, the carrier member 23 is slidably displaced along its rectilinear guide 15 towards the left in the drawing. Thus, the sensor 2 which is carried by the carrier member 23, is moved away from the scanning edge 11 of the feeler 1. When the leading end portion of the fish, for example the neck portion, reaches the sensor 2, the latter is so displaced by interaction with the fish that the switch vane 21 is displaced to actuate the switch 25. An electrical pulse generated by the actuation of the switch 25 is applied to setting means of a fish processing tool (not shown), for example, to initiate or terminate the belly filleting cuts or the rib cuts on the fish.

As indicated in the drawing, the lower limb of the double-armed lever which forms the second sensing element 2 extends, when in its undeflected position, through a slot (not shown) in the roof portion of the generally V-shaped channel defined by the feeler 1. Thus, the second sensing element 2 is arranged to interact with a fish at a position downstream of the position of the feeler 1 which interacts with the fish. On the feeler 1 being pivotally deflected by the fish and to an extent which depends on the size of the fish, the position of the second sensing element 2 is changed relative to the feeler 1 by an amount which depends a. on the proportionality ratio between the pivotable movement of the feeler 1 and the slideable displacement imparted to the carrier member 23, and b. on the actual movement imparted to the feeler 1 by interaction with the fish.

This proportionality ratio is determined by the geometry of the linkage, of which the rod 34, the carrier member 23 and the feeler 1 form respective parts.

Should fish with a different dimensional ratio of, for example, height of the back of the fish and the length of abdominal cavity be processed, then the setting lever 3 is located in a different location of the detent means 32 and the position of the sensor 2 relative to the feeler 1 is thereby altered for the same deflection of the latter. It is thus possible to control one or more tools of a fish processing machine in accordance with different proportionalities of such dimensions in different kinds of fish. One thus does not need, for example in the South Atlantic or the Pacific Ocean, a special processing machine for every kind of fish occurring there, but is able to adapt one machine to a multiplicity of different kinds of fish.

The control means 25 may be in the form of a simple switch operated mechanically by pivotable displacement of the second sensing element 2 about its pivotable connection 22 with the carrier member 23. However, because of the need to operate at high speed, the control means 25 is preferably constructed and arranged to be responsive to movement of the metallic vane of the second sensing element 2 relative to the control means 25 and to operate without substantial inertia. Thus, the control means 25 may for example incorporate magnetic sensing means responsive to movements of the metallic vane in its magnetic field to generate electrical control pulses for controlling a tool of the fish processing machine.

In the preferred embodiment, the carrier member 23 is pivotably connected to one end of the elongate member in the form of the rod 34 and is slidably connected to the first sensing element in the form of the feeler 1. However, in another embodiment, not shown in the drawing, the carrier mamber carrying the second sensing element and the control means is pivotably connected both to the rod and to the feeler so as to form a coupling articulately connecting the ends of the feeler 1 and the rod 34.

What is claimed is:

1. A device for controlling a tool of a fish processing machine in which fish are fed along a feed path, said device comprising control means for generating a signal to control said tool, a first sensing element pivotably mounted on said machine and positioned along said feed path for pivotal displacement in response to engagement with a fish fed along said feed path, a second sensing element operatively coupled to said control means for actuating the latter to generate said signal, carrier means movably mounted on said first sensing element, with said control means immovably mounted on said carrier means and said second sensing element movably mounted on said carrier means, said second sensing element being positioned to engage said fish downstream of said first sensing element for movement of said second sensing element relative to said control means in a direction to actuate said control means, actuating means for displacing said carrier means on said first sensing element in response to the pivotal displacement of said first sensing element and in a preset proportionality ratio to the extent of said pivotal displacement of said first sensing element, whereby to vary the position of said second sensing element relative to said first setting element in accordance with the size of the fish sensed by said first sensing element, and adjustment means to vary the setting of said proportionality ratio.

2. A device according to claim 1 in which said actuating means comprises an elongated member mounted for movement about a pivotal axis spaced from the pivotal axis of said first sensing element, said adjustment means varying the position of said pivotal axis to vary the setting of said proportionality ratio, said carrier means carrying said control means and said second sensing element and being pivotally connected to said elongated member and extending between said elongated member and its movable mount on said first sensing element at points remote from the respective pivotal axes of said elongated member and first sensing element.

3. A device according to claim 1 in which said actuating means comprises an elongated member mounted for movement about a pivotal axis, the position of which is displaced by said adjustment means to vary the setting of said proportionality ratio, said carrier means comprising a carrier member carrying said control means and said second sensing element, said carrier member being pivotally connected to said elongated member at a location thereon remote from the pivotal axis of said elongated member, and being slidably connected to said first sensing element.

4. A device according to claim 2 in which said adjustment means comprises a lever mounted on a fixed pivotal axis and pivotally connected to said elongated member, said lever being adjustably movable to a plurality of selected angular positions each corresponding to a respective pre-set position of the pivotal axis of said elongated member.

5. A device according to claim 1 wherein said control means is constructed and arranged to be responsive to movement of said second sensing element relative to said control means and to operate substantially free of inertia.

6. A device according to claim 3 in which said adjustment means comprises a lever mounted on a fixed pivotal axis and pivotally connected to said elongated member, said lever being adjustably movable to a plurality of selected angular positions each corresponding to a respective pre-set position of the pivotal axis of said elongated member.

* * * * *